United States Patent [19]

Jenkins

[11] 4,311,334
[45] Jan. 19, 1982

[54] UNIVERSAL TOWED VEHICLE WIND UMBRELLA

[76] Inventor: Maurice A. Jenkins, 151 Dix Dr., North Versailles, Pa. 15137

[21] Appl. No.: 88,029

[22] Filed: Oct. 25, 1979

[51] Int. Cl.³ .............................................. B62D 35/00
[52] U.S. Cl. ..................................... 296/1 S; 296/91; 105/20; 280/403
[58] Field of Search .................... 296/1 S, 91; 105/17, 105/20; 280/403

[56] References Cited

U.S. PATENT DOCUMENTS

| | | | |
|---|---|---|---|
| 3,711,146 | 1/1973 | Madzsor | 296/1 S |
| 3,834,752 | 9/1974 | Cook et al. | 296/1 S |
| 4,036,519 | 7/1977 | Servais et al. | 296/1 S |
| 4,082,340 | 4/1978 | Taylor | 296/1 S |
| 4,095,835 | 6/1978 | Ensor | 296/1 S |
| 4,142,755 | 3/1979 | Keedy | 296/1 S |

Primary Examiner—David M. Mitchell
Assistant Examiner—Norman L. Stack, Jr.
Attorney, Agent, or Firm—Harold A. Williamson

[57] ABSTRACT

This invention relates to a universal, towed vehicle wind umbrella for use on a towed vehicle having a projected frontal area of a given size in combination with a towing vehicle having a projected frontal area of a smaller given size than that of said towed vehicle to thereby provide an aerodynamically improved combination of a towing and towed vehicle set. The wind umbrella includes a first section releasably secured to the towed vehicle. A second section is releasably secured to the towing vehicle. The final component of the wind umbrella is an adjustably flexible middle section integrally secured respectively to the first section and the second section to thereby form an aerodynamically efficient vehicle set.

9 Claims, 8 Drawing Figures

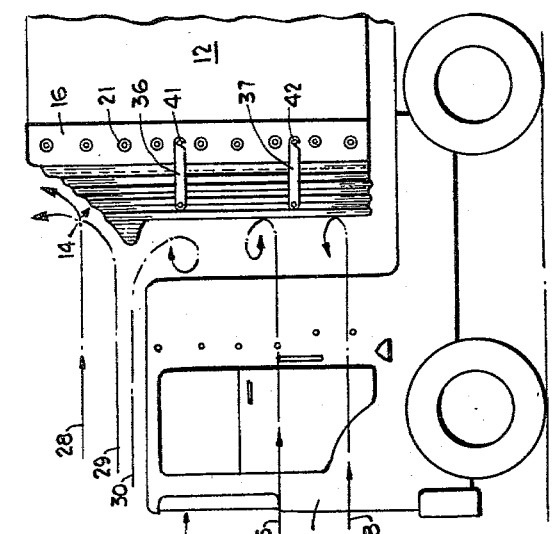
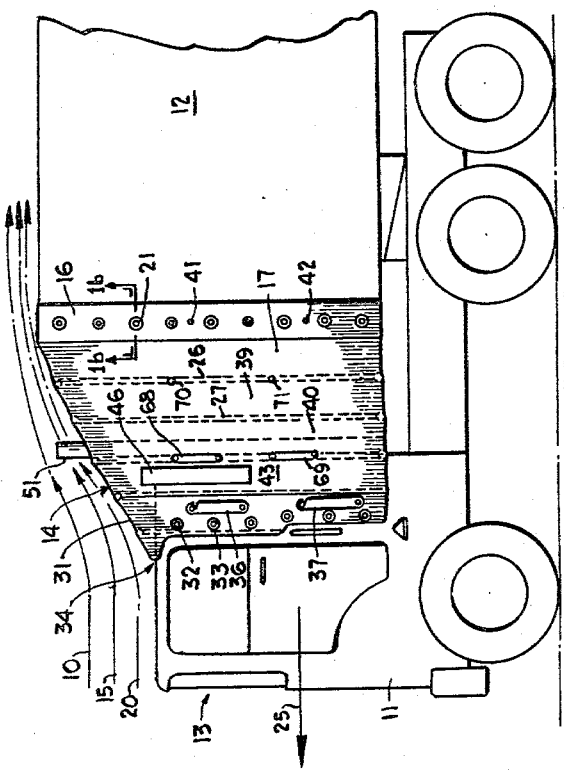
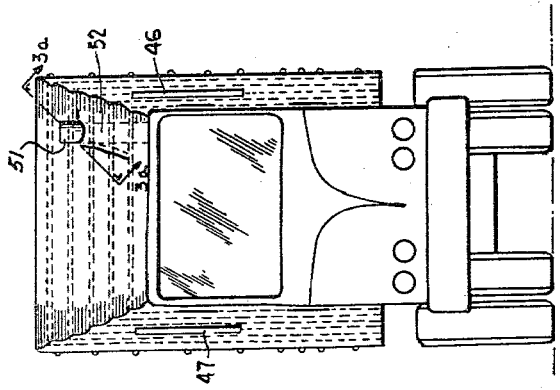
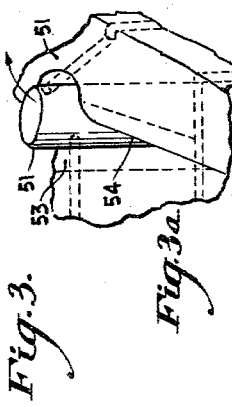
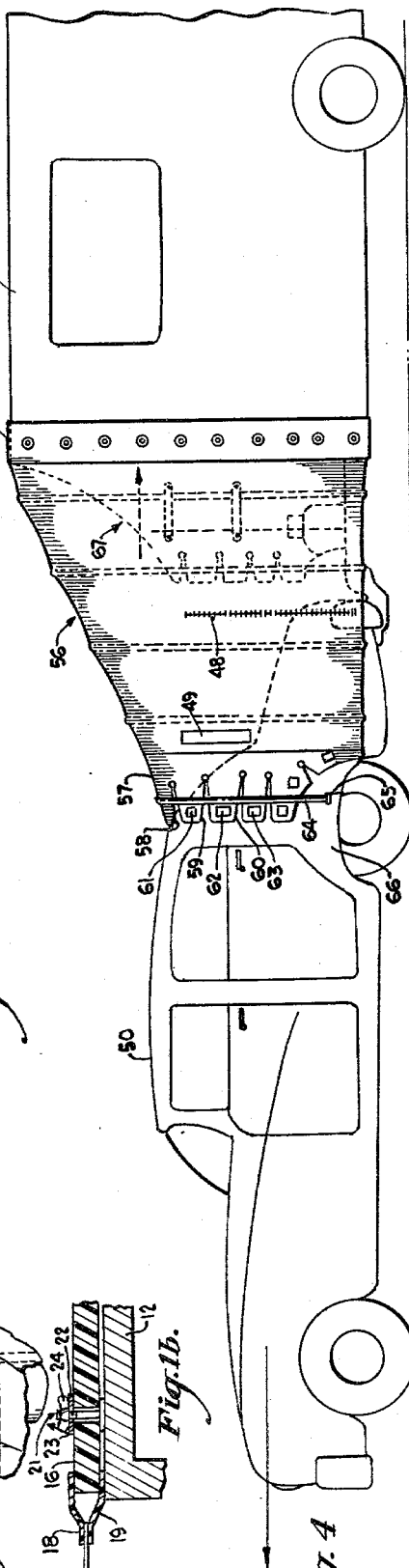

UNIVERSAL TOWED VEHICLE WIND UMBRELLA

This invention relates to a universal towed vehicle wind umbrella.

More specifically, this invention relates to a universal, towed vehicle wind umbrella for use on a towed vehicle having a projected frontal area of a given size in combination with a towing vehicle having a projected frontal area of a smaller given size than that of said towed vehicle to thereby provide an aerodynamically improved combination of a towing and towed vehicle set. The wind umbrella includes a first section releasably secured to the towed vehicle. A second section is releasably secured to the towing vehicle. The final component of the wind umbrella is an adjustably flexible middle section integrally secured respectively to the first section and the second section to thereby form an aerodynamically efficient vehicle set.

The energy crisis and rapidly escalating fuel costs have induced renewed vigor into efforts directed to reduce fuel consumption and improve the efficiency of over the highway vehicles. Automobiles have been streamlined to facilitate air flow over the auto and thereby reduce drag. Even tractor trailer truck combinations have been designed with the thought of improved aerodynamic efficiency and drag reduction. There exist, however, a vast fleet of tractor trailer trucks, as well as auto-travel trailer combinations that inherently present aerodynamically poor and fuel inefficient frontal profiles while in transit.

These aerodynamically poor and fuel inefficient profiles have provided the catalyst for creative thought in respect of ways and means to improve the aerodynamic characteristics and the related fuel efficiency of these tractor trailer and auto-travel trailer combinations.

Typical of these efforts is that shown in the DeVaughn U.S. Pat. No. 3,425,740 for streamlining apparatus for use with tractor trailers and auto-travel trailer combinations. DeVaughn provides rigid pivoted fairings to deflect the wind. The fairings when not in use are stored above the travel vehicle.

Another approach is that provided by the Johnson U.S. Pat. No. 4,030,779 for an inflatable streamlining structure for vehicles in which Johnson mounts inflatable bags or streamlining devices on the front of the towed trailers.

Yet another approach is that shown in the Keedy U.S. Pat. No. 4,142,753 for a vehicle drag reducer which employs rigid air deflector secured to the tractor of a tractor-trailer combination.

Each of the above patents have advanced the state of the art but have fallen short of providing a universal scheme for use in tractor-trailer, as well as auto-travel trailer combinations when there is a great variety of frontal area configurations provided by the towing vehicle.

It is therefore a primary object of the invention to provide a towed and towing vehicle set with a universal aerodynamically efficient apparatus that allows for a variety of different vehicles to efficiently tow a larger vehicle that has a projected frontal area that is larger than the towing vehicle.

Another object of the invention is to provide a wind umbrella that may be secured to a towing vehicle and to be stored on the towed vehicle when the towed vehicle is not in use.

Yet another object of this invention is the provision of an adjustably flexible apparatus that interconnects the towed and towing vehicle set and is relatively transparent thereby enhancing the driver rear view visability when the vehicle set is maneuvering.

In the attainment of the foregoing objects the invention a universal, towed vehicle, wind umbrella for use on a towed vehicle having a projected frontal area of a given size in combination with a towing vehicle having a projected frontal area of a smaller given size than that of the towed vehicle to thereby provide an aerodynamically improved combination of a towing and towed vehicle set. The wind umbrella consists of a first section which is releasably secured to the towed vehicle. In one embodiment of the invention the towed vehicle has a plurality of surface mounted fasteners which cooperate with the first section to allow the first section to be releasably secured to the towed vehicle.

A second section is releasably secured to the towing vehicle and one embodiment this is accomplished through the use of magnetic fasteners.

An adjustably flexible middle section is integrally secured between and respectively to the first and the second sections. In the preferred embodiment of the invention the flexible middle section is fashioned of an accordion pleated transparent plastic material.

One embodiment of the invention includes air scoops in the flexible middle section to allow air to be forced into the region between the towed and towing vehicle to thereby ensure proper ventilation of equipment that might be stored in the space between the two vehicles. The air scoop and the resultant air flow also enhance the removal of exhaust emissions that may become trapped in the space between the two vehicles. When an auto is the towing vehicle the exhaust if not forcefully vented could enter the rear compartment of the auto with a resultant toxic effect on the auto's occupants.

The preferred embodiment of the invention additionally provides means to secure the first and the second section to each other independently of the middle section to thereby allow the adjustably flexible middle section to be compressed and stored between the first and the second sections.

Other objects and features of the present invention will become apparent from the description and claims:

In the drawings:

FIG. 1 is a side view of a tractor-trailer combination with the apparatus containing the invention shown in place.

FIG. 1a is a schematic top view of a tractor-trailer combination embodying the invention.

FIG. 2 is a side view of a tractor-trailer combination with the apparatus embodying the invention shown in a stored condition.

FIG. 1b is a partial cross-section taken along the line 1b—1b in FIG. 1.

FIG. 3 is a front view of the tractor-trailer combination embodying the invention as shown in FIG. 1.

FIG. 3a is a partial section taken along the line 3a—3a in FIG. 3.

FIG. 4 is a side view of an auto-travel trailer combination illustrating the use of the invention.

FIG. 5 depicts a vehicle wind umbrella roof mounting structure.

Reference is now made to FIG. 1 in which there is illustrated a side view of tractor 11 and trailer 12 combination with wind umbrella 14 of the invention shown between the tractor 11 and the trailer 12. Depicted above the cab 13 of the tractor 11, as well as the trailer 12 are air currents shown by arrows 10, 15 and 20. The wind currents move smoothly over the entire structure as tractor-trailer vehicle set 11, 12 moves in the direction indicated by arrow 25.

For purposes of explanation only reference is momentarily made to FIG. 2 to illustrate the wind flow drag problem that the invention overcomes. FIG. 2 serves two purposes. The first is to show the wind umbrella 14 in a stored position prior to being placed in its operative mode as shown in FIG. 1.

The second purpose of FIG. 2 is to show the typical turbulent wind flow patterns that arise when a towed vehicle moves forward without the presence of the invention in its operative mode. Accordingly, attention is directed to air flow arrows 28, 29, 30, 35 and 38 which create fuel robbing inefficiencies due to turbulence when the wind umbrella of the invention is not employed.

It should be understood of course that the vehicle set with the wind umbrella embodying the invention would not in normal use travel with the wind umbrella 14 in a stored position.

Returning to FIG. 1 it can be seen that the wind umbrella 14 can be described as having three sections. The first section 16 is shown releasably secured to trailer 12 by fasteners of which only one, namely, fastener 21 is referenced. The details of the first section 16 and fastener 21 will be described more fully hereinafter when FIG. 1b which shows the details is explained.

The second section 31 as it is termed is at the opposite end of the wind umbrella 14. The second section is more aptly described as a flexible molded second section which mounts over the roof of the tractor cab 13. The second section 31 may be formed of plastic or other suitable material that will flex in a manner that will provide a snug fit as shown by arrow 34 on the roof of cab 13.

The second section 31 as shown releasably secured by fasteners two of which 32, 33 are referenced. The details of these fasteners 32, 33 are the same as that shown in cross-section in FIG. 1b which figure will now be described.

FIG. 1b shows the details of construction of the first section 16. In this figure the middle section 14 is shown made of plastic and having flexible plastic pleat 17 secured to it by means of a pair of bonding strips 18, 19 which may be cemented or bonded by heat and pressure. A protective plate 22 is bonded to the first section 16 and a fastener pin 23 secured at one to the wall of trailer 12, by means not shown. The fastener pin 23 has at other end a pivoted rod 24 that can be rotated into vertical alignment with the fastener pin 23. When the pivoted rod 24 is rotated to the position shown the first section 16 is held in place against the body of the trailer 12. A pleat support rod 26 is shown encapsulated in the flexible plastic pleat material between pleats 17 and 39.

Mounted on the second section are a pair of flexible storage straps 36, 37 which have fasteners of the type shown in FIG. 1b at either end. In FIG. 2 these flexible storage straps are shown positioned with one end respectively over storage strap fastener pins 41, 42.

The third section of the wind umbrella 14 includes flexible plastic pleats 17, 39, 40 and 43. This plastic may be transparent to allow visability through the wind umbrella from the cab 13. These pleats 17, 39, 40 and 43 may be formed of a flexible thermosetting plastic that has a memory in respect of its tendency to return to a folded condition. The "memory" spoken of here is similar to that which is present in a typical telephone cord that is wound into a cylindrically shaped coil.

Each of the pleats 17, 39, 40 for example is separated and supported by pleat support rods 26 and 27. The pleat support rods may be made of plastic or light metal which is preferably tubular in cross-section. The manner in which the support rods are connected to the flexible plastic pleats can be seen in FIG. 1b.

From the above description of FIG. 1 and FIG. 2 it should be readily appreciated that the third section described is adjustably extensible in the same fashion that an accordion is adjustably extensible.

This third section also may include air scoop ducts 46 and 47 which can best be seen in a combined study of FIG. 1 and FIG. 3. The air scoops provide a dual purpose. When the trailer 12 has an air conditioning unit mounted on the front thereof (a situation not depicted here) the air conditioner condensing coils will be furnished with a supply of cooling air. The air scoop also enhances the removal of trapped exhaust fumes that may arise between the towing and towed vehicle and somehow seep back into the passenger compartment of the towing vehicle.

This third section may also include take-up straps 68, 69 which can be secured to releasable fasteners 70, 71 in the event that trailer 12 is used with a tractor that fits closer to the trailer 12.

Attention is now directed to FIG. 3 in which there is shown in the middle section of the wind umbrella 14 a flap 52 which is provided to allow for the presence of an exhaust pipe 51 and its passage there through.

The details of the flap arrangement 52 are best seen in FIG. 3a where the flap 51 is shown pulled away from the closed position indicated in FIG. 3. In the pulled away position shown the exhaust pipe 51 can be seen, as well as a Velcro fastener surfaces 53, 54. A zipper could well be substituted for the Velcro fastener.

FIG. 1a shows the dynamic action of the wind umbrella between tractor 11 and trailer 12 as the vehicle set is maneuvering. It should be noted that the clear plastic construction noted earlier allow for a relatively unobstructed view from the rear window of the truck cab.

Reference is now made to FIG. 4 which shows the universal wind umbrella 56 of the invention in an extended position between a towed travel trailer 55 and a towing auto 50. Also shown in dotted outline 67 is the wind umbrella in a position approaching a full stored condition of the type depicted in FIG. 2. The details of the manner in which the first section 54 is secured to the travel trailer 55 are the same as that described in respect of FIG. 1 and the trailer 12 first section 16 description.

FIG. 4 shows a variation of the construction details of the second section 57. The second section 57 depicted here would also be formed of a flexible plastic material, however, the material would include preformed slits such as slits 58, 59 and 60. These slits would allow the second section to fit a variety of auto rear cross-sectional configurations. In place of fasteners of the type described in respect of FIG. 1, the second section would have magnetic material 61, 62, 63 embedded within the second section. These magnets would hold the second section securely to the auto in much the same manner that citizen band radio antennas are presently secured to the roof structures of autos today. Should further security be desired the user of the wind umbrella might add an elastic rope 64 with a hook 65 secured to a fender 66. The elastic rope 64 would of course be threaded through loops not shown on the second section, pass over the second section 57 and be secured to a fender on the other side of the auto not shown.

Air scoops one of which 49 is shown would also be included to enhance accumulated exhaust gas reduction from the region between the auto 50 and travel trailer 55.

Also shown in FIG. 4 is a zipper 48 positioned at a point near the rear of the auto's back bumper shown in dotted outline but not referenced. The zipper 48 allows access to the auto's trunk when the vehicle set is at rest. The zipper 48 provides a releasable opening. Any suitable fastener, such as, but not limited to a Velcro fastener would also be acceptable.

FIG. 5 shows the cross-sectional detail of another manner of securing the second section to a roof structure of an auto or trailer. There are included a plurality of magnets or suction cups 68, 69, 70, 71 and 72 secured to the roof structure 73. A flat second section leading edged support rod 74 is fastened by means not shown to all of the magnets or suction cups just referenced. The ends 75, 76 of the leading edge support rod 74 are secured by adjustable straps 77, 78 to roof gutters 79, 80. A lead edge hold down bar 81 has secured between it and the leading edge support rod 74 the leading edge 82 of a second section. A plurality bolts and wing nuts 83, 84, 85 and 86 apply the force necessary to secure the leading edge 82 of the second section secure from disturbance by even the strongest combination of vehicle speed and head wind.

Although two embodiments of the present invention have been illustrated and described, it will be apparent to those skilled in the art that various changes and modifications may be made to these embodiments without departing from the spirit of the invention as set forth in the claims.

What is claimed as new:

1. A universal, towed vehicle, wind umbrella for use on a towed vehicle having a projected frontal area of a given size in combination with a towing vehicle having a projected frontal area of a smaller given size than that of said towed vehicle to thereby provide an aerodynamically improved combination of a towing and towed vehicle set, said wind umbrella comprising a first section having only a pair of vertical sides and a top side which are integrally connected to said pair of vertical sides releasably secured to and over the sides and top of said towed vehicle, and a second flexible moulded section which mounts over a portion of the roof of said towing vehicle and is releasably secured thereto, and an adjustably flexible middle section integrally secured respectively to said first section and to said second section to thereby form a three sided universally mountable and aerodynamically efficient vehicle set, when said vehicle set is moving, said first, middle and second sections, upon release from said towing vehicle for storage on said towed vehicle thereby freeing said towing vehicle from being encumbered by said wind umbrella while operating away from the towing and towed vehicle set.

2. The universal, towed vehicle, wind umbrella of claim 1 wherein said towed vehicle has a plurality of surface mounted fasteners which cooperate with said first section to allow said first section to be releasably secured to said towed vehicle.

3. The universal, towed vehicle, wind umbrella of claim 2 wherein said second section includes magnetic fastening integrally formed in said second section to thereby allow said first section to be releasably secured to said towing vehicle.

4. The universal, towed vehicle, wind umbrella of claim 3 wherein said adjustably flexible middle section is fashioned of accordion pleated material.

5. The universal, towed vehicle, wind umbrella of claim 4 wherein the material of said adjustably flexible middle section is transparent plastic.

6. The universal, towed vehicle, wind umbrella of claim 4 wherein said second section includes means to adjustably fit a plurality of towing vehicles each having a different projected frontal areas, said different projected frontal areas always being less than said projected frontal area of said towed vehicle.

7. The universal, towed vehicle, wind umbrella of claim 4 wherein said adjustably flexible middle section includes at least one air scoop opening to provide ventilation to the region between said towed and towing vehicle, which region is covered by said middle section of said wind umbrella.

8. The universal, towed vehicle, wind umbrella of claim 3 wherein said adjustably flexible middle section includes an opening to allow passage of exhaust pipe.

9. The universal, towed vehicle, wind umbrella of claim 3 wherein means are provided to secure said first and said second section to each other independently of said middle section to thereby allow said adjustably flexible middle section to be compressed and stored between said first and said second sections.

* * * * *